United States Patent
Bond, Jr. et al.

(10) Patent No.: US 6,622,853 B2
(45) Date of Patent: Sep. 23, 2003

(54) PIVOTING MOUNTING BLOCK FOR MOTORIZED CONVEYOR PULLEYS

(75) Inventors: Stephen E. Bond, Jr., Fort Worth, TX (US); James K. Simonelli, Sun Prairie, WI (US)

(73) Assignee: Emerson Electric Co., St. Louis, MO (US)

( * ) Notice: Subject to any disclaimer, the term of this patent is extended or adjusted under 35 U.S.C. 154(b) by 120 days.

(21) Appl. No.: 09/754,721

(22) Filed: Jan. 4, 2001

(65) Prior Publication Data

US 2001/0037929 A1 Nov. 8, 2001

Related U.S. Application Data

(63) Continuation-in-part of application No. 09/187,893, filed on Nov. 6, 1998.

(51) Int. Cl.⁷ .............................................. B65G 13/12
(52) U.S. Cl. ......................... 198/782; 198/788; 193/37
(58) Field of Search ................................. 198/782, 788, 198/835, 842; 193/37, 35 R

(56) References Cited

U.S. PATENT DOCUMENTS

| | | | |
|---|---|---|---|
| 2,010,587 A | 8/1935 | Fisher et al. | |
| 2,100,642 A | 11/1937 | Geyer | |
| 3,037,799 A | 6/1962 | Mulac | |
| 3,196,463 A | 7/1965 | Farneth | |
| 3,708,079 A * | 1/1973 | Wloszek | 214/338 |
| 4,155,670 A | 5/1979 | Stafford | |
| 4,598,815 A * | 7/1986 | Adama | 198/782 |
| 4,662,772 A | 5/1987 | Schultz | |
| 4,693,462 A * | 9/1987 | Pollich | 271/183 |
| 5,099,119 A * | 3/1992 | Horikawa | 198/810 |
| 5,165,838 A * | 11/1992 | Kallansrude et al. | 414/471 |
| 5,284,397 A | 2/1994 | Hayashi | |
| 5,368,431 A * | 11/1994 | Willey et al. | 414/412 |
| 5,482,379 A | 1/1996 | Harris et al. | |
| 5,833,171 A * | 11/1998 | Harris | 242/615.1 |

* cited by examiner

Primary Examiner—Douglas Hess
(74) Attorney, Agent, or Firm—Harness, Dickey & Pierce, P.L.C.

(57) ABSTRACT

A dead shaft or motorized conveyor pulley in which a drum is mounted for rotation about an axis of rotation on a shaft mounted against rotation, has the shaft mounted in a pivot sphere. The sphere is mounted in a complementarily-socketed block against rotation around the axis of rotation but to permit angular movement in response to misalignment of the shaft from one of the drum to the other end during installation.

12 Claims, 1 Drawing Sheet

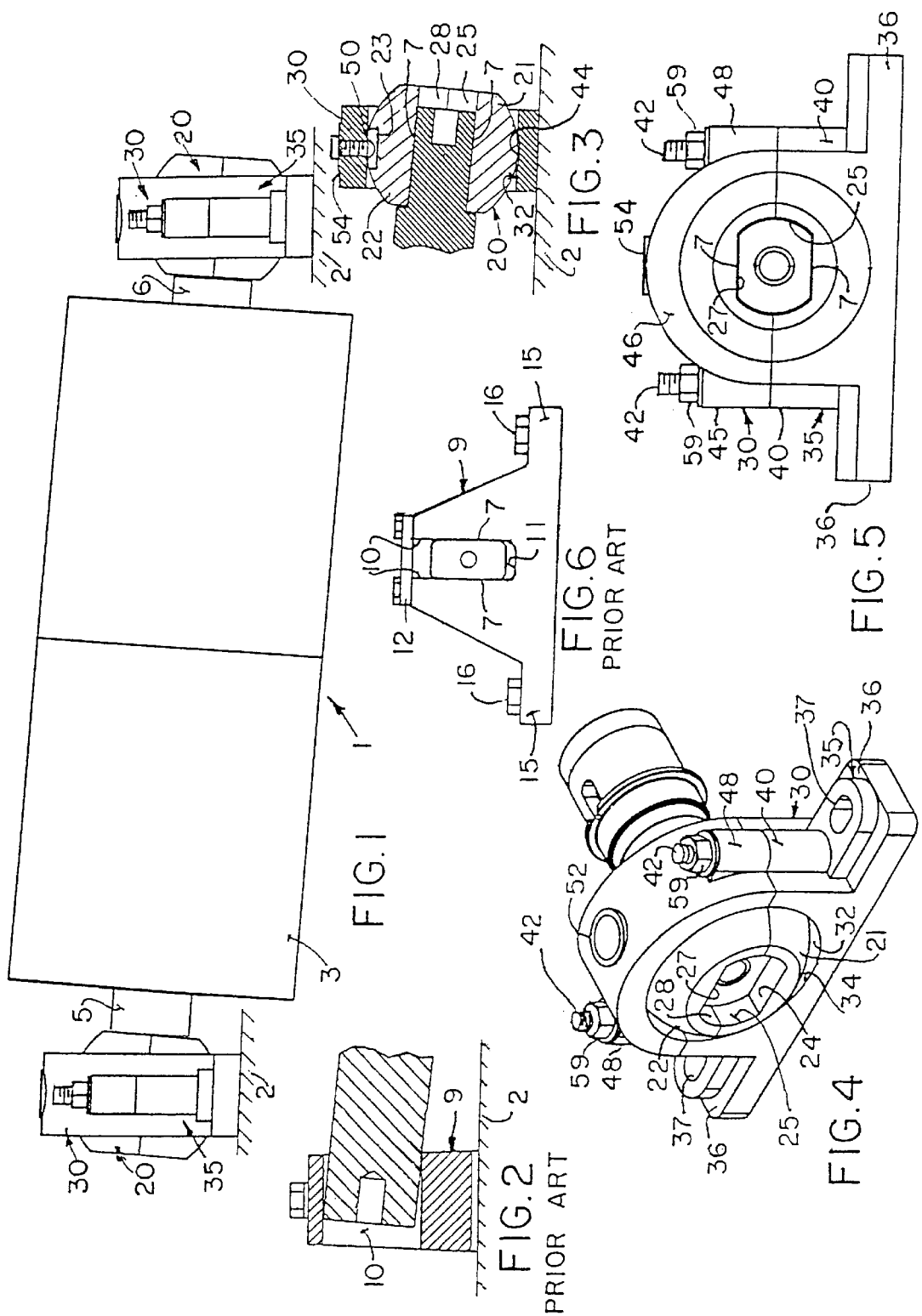

PIVOTING MOUNTING BLOCK FOR MOTORIZED CONVEYOR PULLEYS

CROSS-REFERENCE TO RELATED APPLICATIONS

This is a continuation in part of our application Ser. No. 09/187,893, filed Nov. 6, 1998.

STATEMENT REGARDING FEDERALLY SPONSORED RESEARCH OR DEVELOPMENT

Not Applicable.

BACKGROUND OF THE INVENTION

The invention of this application is described as applied to motorized conveyor pulleys, but it has application to dead shaft pulleys (those in which the shaft of a pulley is fixed against rotation, the drum of the pulley being mounted on bearings to rotate about the shaft) generally as well. Motorized conveyor pulleys have an electric motor inside a drum of the pulley, and a shaft with extensions at each end, fixed against rotation in mounting blocks mounted on a conveyer frame. Conveyer frames are welded structures that inherently do not have the positional accuracy required to mount machine components. Machining the frame structure to create a proper alignment is expensive and many conveyor structures are too large to be machined. In a motorized conveyor pulley a rigid mounting of the pulley in misalignment will cause excessive stress and lead to early failure of either the pulley or the frame. Thus, there must be some provision for aligning the shaft extensions and mounting blocks when the pulley is installed.

Conventionally, the shaft extensions of a motorized conveyor pulley are loosely fitted in mounting blocks in the form of yokes to allow for misalignment. Such a loose fit is noisy and leads to wear due to relative motion and impact loading. This is likely to cause early failure. For food and beverage service, the gap between the shaft and the mounting block can trap food.

One of the objects of this invention is to provide a mounting structure for a motorized conveyor pulley that accommodates misalignment but at the same time minimizes noise and relative motion, and provides a more sanitary arrangement for food and beverage service installations.

Other objects will become apparent to those skilled in the art in the light of the following description and accompanying drawings.

BRIEF SUMMARY OF THE INVENTION

In accordance with this invention, generally stated, a mounting for a dead shaft or motorized conveyor pulley is provided in which the shaft of the pulley is mounted at least one end in a pivot sphere, the sphere being mounted in a complementarily socketed block against rotation around the axis of rotation of the shaft when pulley is in use, but to permit angular movement in response to misalignment of the shaft from one end of the drum to another end during its installation. In a motorized pulley, the shaft is a composite, with shaft extensions extending from both ends of a pulley drum. Inasmuch as the extensions are part of the shaft as a whole, they are encompassed within the term "shaft" as used herein, when referring to the shaft's projecting from the drum. Preferably, each of the shaft extensions is mounted in a sphere against rotation. In both the dead shaft and motorized pulleys, the sphere is held against rotation around the axis of the shaft by clamping of the mounting block around the sphere. A positive restraint as a back-up can be provided in the form of a pin extending from the mounting block into a slot in the exterior of the sphere parallel to the axis of rotation of the pulley.

BRIEF DESCRIPTION OF THE SEVERAL VIEWS OF THE DRAWINGS

In the drawings,

FIG. 1 is a view in side elevation of a motorized conveyor pulley mounted in accordance with one illustrative embodiment of this invention. Shaft extensions 5 and 6 are shown as exaggeratedly misaligned in a vertical plane, to illustrate the capability of the mounting assembly in this invention;

FIG. 2 is a sectional view of a prior art mounting block and shaft;

FIG. 3 is a fragmentary sectional view of the shaft, sphere and mounting block shown on the right end of the pulley of FIG. 1;

FIG. 4 is a view in perspective of the mounting block and sphere and a shaft extension of this embodiment of the invention, with a threaded holding pin omitted;

FIG. 5 is a view in end elevation of the block shown in FIG. 4; and

FIG. 6 is a view in end elevation of the block shown in FIG. 2, being part of the prior art.

Corresponding reference numerals will be used throughout the several figures of the drawings.

DETAILED DESCRIPTION OF THE INVENTION

Referring now to the drawings for one illustrative embodiment of this invention, reference numeral 1 indicates a motorized conveyor pulley, which can be conventional as described in an application, now U.S. Pat. No. 6,117,318, co-pending with the parent of the present application Ser. No. 09/187,893, assigned to a common assignee. The pulley 1 is bolted to a support structure 2, shown only fragmentarily, by means of bolts, as indicated at 16 in FIG. 6, the use of such bolts being conventional. The pulley includes a drum 3 and two shaft extensions, 5 and 6, cylindrical through their central section, but provided at their projecting ends with flats 7.

FIGS. 2 and 6 illustrate a conventional mounting, in which a shaft is loosely confined in a yoke 9, within a slot defined by side walls 10 and a bottom wall 11, which permits vertical misalignment, and a limited amount of horizontal angular misalignment, but suffers from the disadvantages described heretofore.

In the present invention, the shaft extensions 5 and 6 are mounted against rotation in spheres 20. In the embodiment shown, the spheres 20 are made in the form of two hemispheres, a lower hemisphere 21 and an upper hemisphere or bearing cap 22. The upper hemisphere 22 has, in this embodiment, an axial slot 23 in its uppermost surface, defined by parallel side walls and a bottom wall, as shown in FIG. 3. Each of the shafts 5 and 6 is mounted to fit closely in a seat defined by a flat bottom 24 and arcuate side walls 25 in the lower hemisphere and a flat upper wall 27 and arcuate side walls 28 in the upper hemisphere. The close fit substantially eliminates the noise and wear permitted by the conventional yoke. The spheres are mounted in mounting blocks 30, and seated in sockets 32 formed in the mounting blocks 30. The mounting blocks 30 are made in two parts, a lower seat part 34 and an upper seat part or bearing cap 46. The lower seat part 34 has a base 35 from which ears 36 extend. Ears 36 have bolt holes 37 through them by which the mounting blocks are mounted on the support structure. The base 35 has bolt bosses 40, from which bolts 42, parallel to one another, project toward the upper seat part. The seats of the socket 32 are in the form of a semicircular groove or channel 44 in the lower seat part and 50 in the upper seat part 46. The grooves 44 and 50 are aligned, to form an annular seat when the parts 34 and 46 are mounted, interrupted only by a narrow gap 60 between the seat parts 34 and 46 when the sphere is installed. The upper seat part 46 has bolt bosses 48 through which the bolts 42 extend, the bolts projecting from an upper surface of the bolt bosses sufficiently far to receive nuts 59. The provision of the gap 60 permits the sphere to be gripped tightly between the seat parts to prevent rotation of the sphere when the nuts 59 on the bolts 42 are torqued down.

An internally threaded bolt hole 52, extending radially through the upper seat 46, is aligned with the slot 23. A threaded pin 54, mounted in the bolt hole 52, extends into the slot 23, closely adjacent but clear of the bottom wall of the slot, so as to permit angular movement of the shafts in a vertical plane, and is provided with sufficient clearance between the side walls of the slot 23 to permit angular movement of the sphere 20 about the pin 54 as a pivot in a horizontal plane. Thus the axis of rotation of the drum has freedom to pitch and yaw, but not to translate or roll.

As has been indicated, tightening the nuts 59 on the bolts 42 clamps the sphere between the upper and lower seat members 34 and 46. In the embodiment described, if the clamping pressure should be unintentionally relaxed enough to permit rotation of the sphere, the sphere will be prevented from rotating around the axis of the shaft by the pin 54, but it is intended that the clamping pressure be sufficient to prevent rotation after the pulley has been installed and the nuts 59 torqued down. The width of the gap 60 and the amount of torque applied to the nuts 59 will vary with the size of the pulley, hence the size of the spheres and mounting blocks.

In installing the pulley, the lower part of each mounting block is loosely mounted on a rail of a supporting structure, the spheres, in which the shaft extensions 5 and 6 are mounted, are seated in the lower part of the mounting block, and the upper part of the mounting block is put in place over the spheres, with the bolts 42 extending through the bosses 48, and the nuts 59 started but not tightened. Bolts by which the housing is mounted on the structure extend through the bolt holes 37, but are not initially tightened. The pulley is aligned, the loosely mounted housing itself and the untightened spheres permitting accurate alignment in spite of any structural inaccuracies of the support structure. The bolts by which the housing is mounted on the structure are then tightened. The nuts 59 on the bolts 42 are then torqued to a torque value producing predetermined pressure on the spheres 20 and 22, that pressure being determined by the size and expected load of the pulley, but being readily calculable.

Numerous variations in the construction of the mounting assembly of this invention, within the scope of the appended claims, will occur to those skilled in the art in the light of the foregoing disclosure. For example, although the present arrangement is preferred, the sphere and socket mounting can be applied to only one end of the shaft or shaft extension. The pin and slot can be omitted entirely. A boss or pin in the outer surface of the sphere can be seated in a well or slot in the socket seat. An axial boss or bar or pin carried by the mounting block can be directed through an hourglass— shaped channel in the sphere or vice versa. The ends of the shafts can be differently formed, as, for example, polygonally or otherwise non-circularly instead of with flats. The flats and corresponding sphere seats can be oriented differently, as for example rotated ninety degrees from the position shown in FIGS. 1, 3, 4 and 5. The sphere can be made in one piece and mounted on the shaft extension before it is mounted in the bearing housing. The socket can be made to enclose the sphere more completely, and the open end of the seat in which the shaft end is mounted can be closed, for food conveyor applications, although the construction shown is an improvement over the prior art in that respect. As has been indicated, the sphere assembly can be provided at one or both ends. These variations are merely illustrative.

What is claimed is:

1. A conveyor pulley comprising a cylindrical drum mounted for rotation about a substantially fixed axis of rotation on a shaft mounted against rotation, an end of said shaft extending from said drum being mounted in a pivot sphere, said sphere being mounted against rotation around said axis of rotation in a socketed mounting block fixedly mounted on a support structure.

2. The conveyor pulley of claim 1, wherein said shaft projects from both ends of said drum, both said ends of said shaft being mounted against rotation in pivot spheres in socketed mounting blocks fixedly mounted on said support structure.

3. The conveyor pulley of claim 2 wherein the spheres are restrained against rotation solely by clamping pressure between two parts of said mounting blocks.

4. The conveyor pulley of claim 1 wherein the sphere is restrained against rotation solely by clamping pressure between two parts of said block.

5. The conveyor pulley of claim 4 including means for positively restraining said sphere from rotation about said axis of rotation.

6. The conveyor pulley of claim 5 wherein said means for positively restraining said sphere comprise an axially directed slot in an outer surface of said sphere, said slot being defined by chordally extending walls and a bottom wall, and a pin carried by said block and extending within the compass of said slot between and closely adjacent said walls.

7. The pulley of claim 1 wherein the sphere is provided with a non-circular seat and the end of the shaft is formed complementarily to provide a close but slideable fit.

8. A method of making and installing a conveyor pulley comprising mounting a drum for rotation about a substantially fixed axis of rotation on a shaft, mounting an end of said shaft against rotation about said axis of rotation in a pivot sphere, loosely mounting on a support structure for said pulley a mounting block having a socket formed complementarily to said pivot sphere, loosely mounting said pivot sphere in said mounting block, aligning said pulley and thereafter fixedly mounting said mounting block on said supporting structure, and restraining said sphere against rotation in said mounting block.

9. A method of making and installing a conveyor pulley comprising mounting a drum having a pair of axial ends for rotation about a substantially fixed axis of rotation on a pair of shaft ends wherein each shaft end projects from one of the axial ends of the drum, mounting each shaft end against rotation in a pivot sphere, mounting on said support structure two mounting blocks, one for each sphere, loosely mounting said pivot spheres in said mounting blocks, aligning said pulley and thereafter fixedly mounting both mounting blocks and restraining both pivot spheres against rotation in said mounting blocks.

10. A method of making and installing a conveyor pulley in which a drum is mounted for rotation about an axis of rotation on a shaft mounted against rotation, comprising mounting an end of said shaft against rotation about said axis of rotation in a pivot sphere, loosely mounting on a support structure for said pulley a mounting block having a socket formed complimentary to said pivot sphere, loosely mounting said pivot sphere in said mounting block, aligning said pulley and thereafter fixedly mounting said mounting block on said supporting structure, and restraining said sphere against rotation in said mounting block, wherein said mounting block is made with upper and lower parts separated by a narrow gap when the sphere is in place, said upper and lower parts being joined by bolts and nuts, and the method includes torquing the nuts to a predetermined torque value to produce a desired pressure to clamp the sphere between said upper and lower parts after the pulley is in place.

11. A method of making and installing a conveyor pulley in which a drum having a pair of axial ends is mounted for rotation about an axis of rotation on a pair of shaft ends, wherein each shaft end projects from one of the axial ends of the drum, the method comprising mounting each shaft end against rotation in a pivot sphere, mounting on said support structure two mounting blocks, one for each sphere, loosely mounting said pivot spheres in said mounting blocks, aligning said pulley and thereafter fixedly mounting both mounting blocks and restraining both pivot spheres against rotation in said mounting blocks, wherein said mounting blocks are made with upper and lower parts separated by a narrow gap when the sphere is in place, said upper and lower parts being joined by bolts and nuts, and the method includes torquing the nuts on both mounting blocks to a predetermined torque value to produce a desired pressure to clamp the sphere between said upper and lower parts after the pulley is in place.

12. A motorized conveyor pulley in which an electric motor is mounted inside a cylindrical drum, said drum being mounted for rotation about a substantially fixed axis of rotation on a shaft mounted against rotation, an end of said shaft being mounted in a pivot sphere, said sphere being mounted against rotation around said axis of rotation in a socketed mounting block fixedly mounted on a support structure.

* * * * *